United States Patent [19]
Schenkel

[11] Patent Number: 6,040,686
[45] Date of Patent: Mar. 21, 2000

[54] LOW NOISE STEP-DOWN SWITCHING REGULATOR CIRCUITS WITH PROGRAMMABLE SLEW RATE LIMITER AND METHODS OF USE

[75] Inventor: Jeffrey Schenkel, Burlington, Mass.

[73] Assignee: Linear Technology Corporation, Milpitas, Calif.

[21] Appl. No.: 09/227,002

[22] Filed: Jan. 7, 1999

[51] Int. Cl.[7] .................................................. G05F 1/40
[52] U.S. Cl. ........................ 323/282; 323/290; 323/286
[58] Field of Search .................................. 323/282, 284, 323/285, 286, 290

[56] References Cited

U.S. PATENT DOCUMENTS

| | | | |
|---|---|---|---|
| 5,397,967 | 3/1995 | Carobolante et al. | 318/254 |
| 5,929,692 | 7/1999 | Cartsten | 327/531 |
| 5,949,249 | 9/1999 | Preuss et al. | 326/27 |
| 5,952,817 | 9/1999 | Brewster et al. | 323/268 |

FOREIGN PATENT DOCUMENTS 0 874 461 A2  10/1998  European Pat. Off. ....... H03K 17/16

OTHER PUBLICATIONS

Frank Goodenough, "Power Supply Designers Trade–Off Efficiency For Noise With Switcher IC," Electronic Design, 45:40–44, Aug. 1997.

Jim Williams, "A Monolithic Switching Regulator With 100 $\mu$V Output Noise," Application Note 70, Linear Technology Corporation, Oct. 1997.

LT1533 Data sheet, Linear Technology Corporation, Sep. 1997.

LT1534 Data sheet, Linear Technology Corporation, Mar. 1998.

*Primary Examiner*—Peter S. Wong
*Assistant Examiner*—Bao Q. Vu
*Attorney, Agent, or Firm*—Fish & Neave; James Trosino

[57] ABSTRACT

The invention provides buck switching regulator circuits that include voltage slew rate limiting circuitry and current slew rate limiting circuitry. The specification describes current-mode and voltage-mode control implementations that provide efficient low-noise switching regulator circuits.

33 Claims, 10 Drawing Sheets

LOW NOISE STEP-DOWN SWITCHING REGULATOR CIRCUITS WITH PROGRAMMABLE SLEW RATE LIMITER AND METHODS OF USE

BACKGROUND OF THE INVENTION

The present invention relates to switching voltage regulator circuits. More particularly, the present invention relates to step-down direct current-to-direct current (DC-to-DC) switching converter circuits (also called "buck switching regulators") that provide lower noise and programmable slew rate limiting compared to previously known buck switching regulators.

Figure 1:
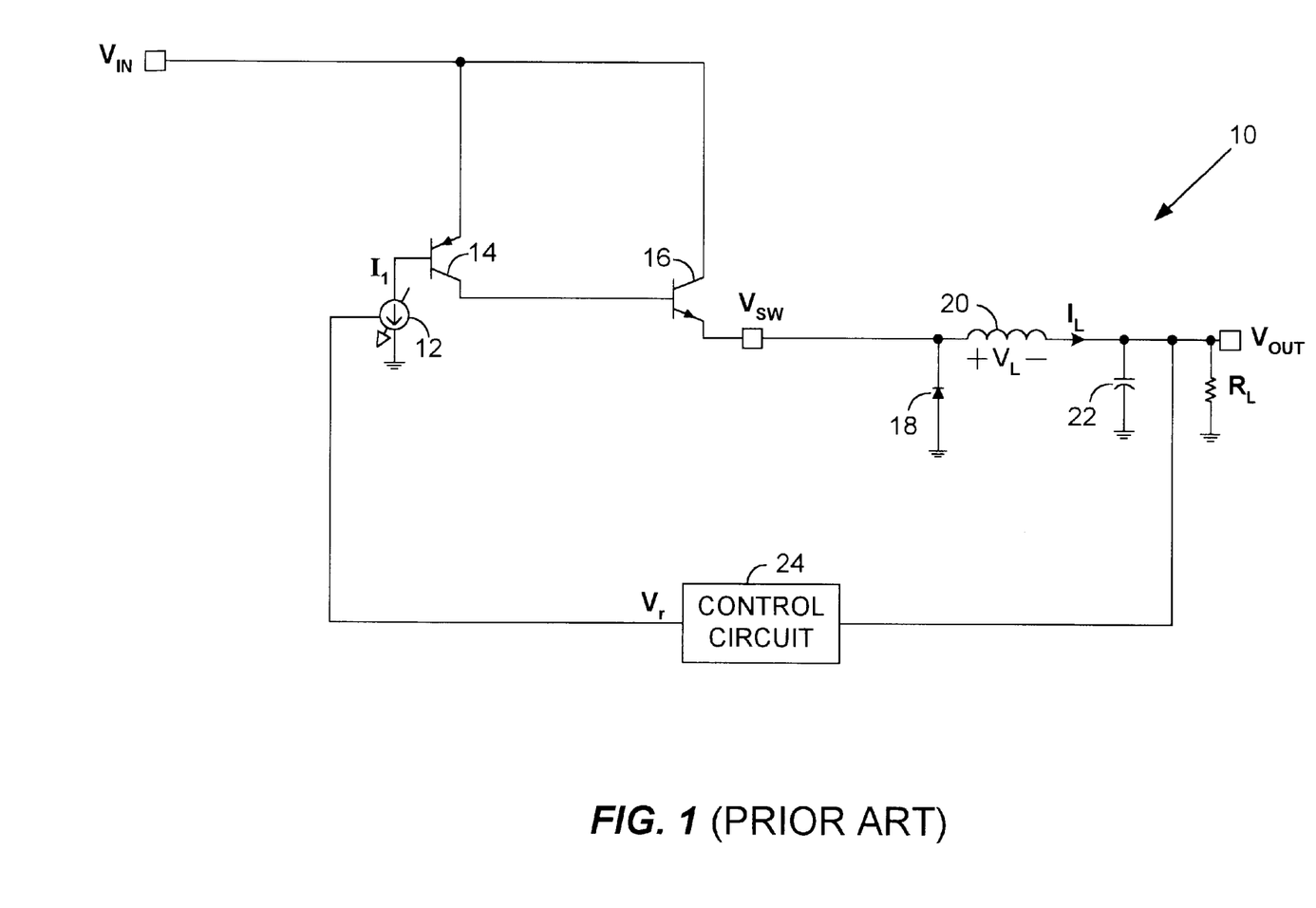
FIG. 1 is a schematic diagram of a previously known buck switching regulator.

FIG. 1 illustrates a previously-known buck switching regulator that provides a predetermined and substantially constant output voltage $V_{OUT}$ from an unregulated positive supply voltage $V_{IN}$ (e.g., a battery) for driving a load $R_L$, which, although simply shown as a resistor, may be, for example, a portable communication device or a computer. Buck switching regulator 10 includes controlled current source 12, transistors 14 and 16, diode 18, inductor 20, capacitor 22, and control circuit 24. Control circuit 24 generates control signal $V_r$, which switches at a desired switching frequency, typically 100–300 kHz.

Regulator 10 operates as follows: at the beginning of a switching cycle, control signal $V_r$ goes HIGH, causing controlled current source 12 to conduct current $I_1$, and turn ON transistor 14. The collector of transistor 14 drives the base of transistor 16, turning ON transistor 16. Once transistor 16 turns ON, the emitter current of transistor 16 rapidly increases at a high positive current slew rate. Following current slewing, the voltage at inductor input node $V_{SW}$ rapidly increases at a high positive voltage slew rate to approximately $V_{IN}$. Diode 18 is OFF, and a voltage $V_L$ of approximately $V_{IN}-V_{OUT}$ appears across inductor 20, which converts the switched voltage pulses into inductor current $I_L$. Inductor 20 and capacitor 22 form a low-pass filter to remove components at the switching frequency and its harmonics from output voltage $V_{OUT}$.

Control circuit 24 monitors output voltage $V_{OUT}$ and provides control signal $V_r$ that regulates the output voltage by varying the ON-OFF times of transistor 16 (i.e., varying the regulator's duty cycle, which is the percentage of time that a switch is ON during a cycle of operation). In particular, when $V_r$ is LOW, controlled current source 12 turns OFF, which turns OFF transistors 14 and 16. As transistor 16 turns OFF, the voltage at inductor input node $V_{SW}$ rapidly decreases at a high negative voltage slew rate to approximately GROUND. Following voltage slewing, the emitter current of transistor 16 rapidly decreases at a high negative current slew rate. In addition, $V_L$ changes to approximately $-V_{OUT}$, diode 18 turns ON and conducts inductor current $I_L$, and inductor input node $V_{SW}$ remains at approximately GROUND until the next cycle of control signal $V_r$.

During each switching cycle, therefore, inductor input node $V_{SW}$ switches between approximately $V_{IN}$ and GROUND. To minimize instantaneous power loss and self-heating in transistor 16 and maximize overall efficiency during switching transitions, the positive and negative current and voltage slew rates of transistor 16 are relatively high. The fast slew rates, however, also generate electromagnetic interference (EMI), commonly called "noise," in the form of both conducted and radiated interference.

Some buck regulator applications require both low noise and high efficiency, such as data acquisition systems and communications systems. Although a linear regulator would satisfy the noise requirements for such applications, linear regulators cannot provide the required efficiency. Conventional buck switching regulators can meet the efficiency requirements for such applications but cannot satisfy the low noise requirements. It therefore would be desirable to provide buck switching regulator circuits that provide high efficiency but have limited voltage and current slew rates for low noise applications.

SUMMARY OF THE INVENTION

Accordingly, it is an object of this invention to provide buck switching regulator circuits that provide high efficiency but have limited voltage and current slew rates for low noise applications.

In accordance with this and other objects of the present invention, buck switching regulator circuits are described that include voltage slew rate limiting circuitry and current slew rate limiting circuitry. The slew rate limiting circuits may be implemented in buck switching regulators that use either current programmed or duty ratio control.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF THE INVENTION

To provide background for the present invention, the following detailed description first describes previously known buck switching regulator circuits. Then, the modification of such previously known regulators to construct low noise regulators is described and alternative embodiments are disclosed.

A. Prior Art Buck Switching Regulators

Figure 2:
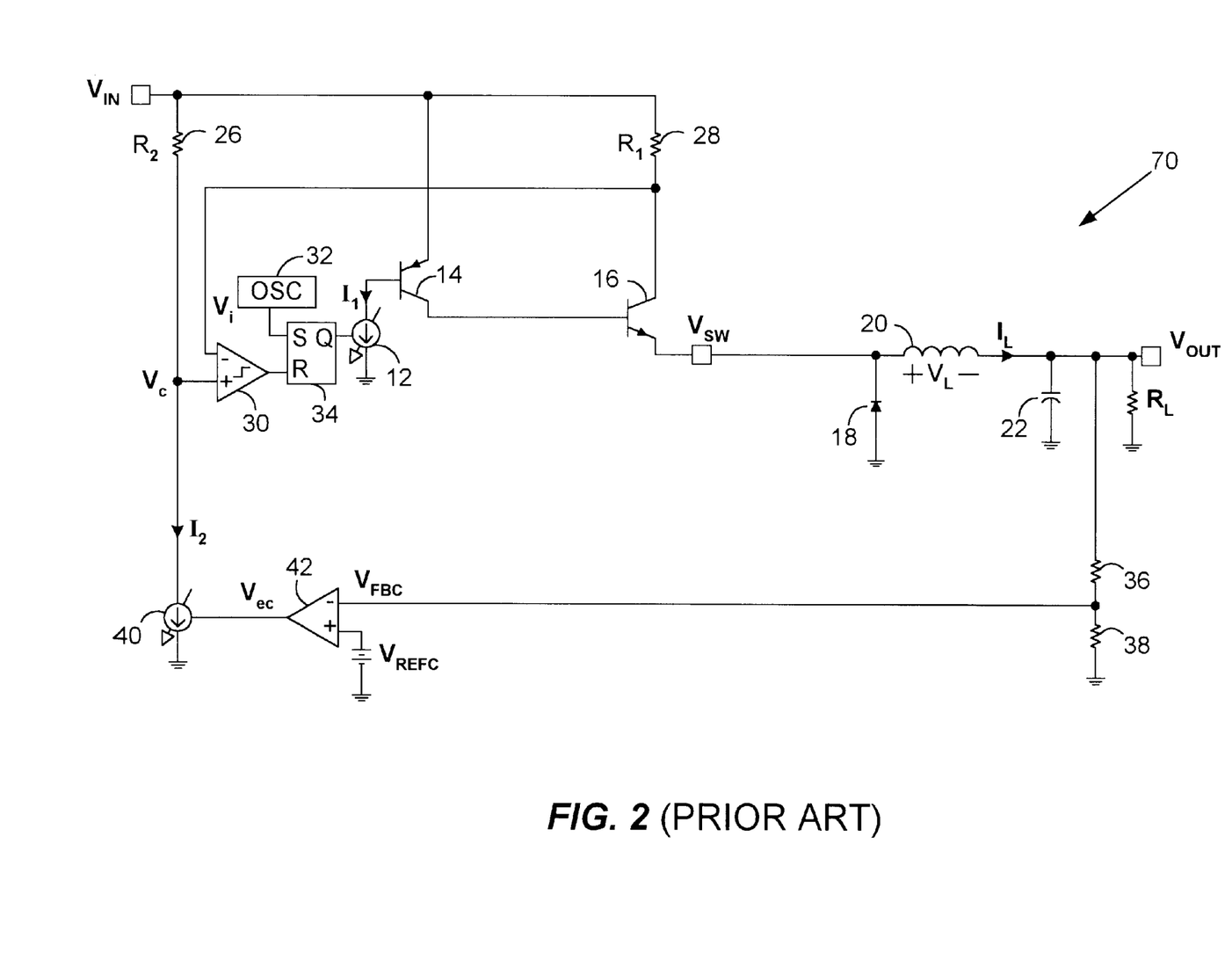
FIG. 2 is a schematic diagram of a previously known buck switching regulator implemented with current programmed control.

FIG. 2 shows a prior art current programmed control buck switching regulator 70. Regulator 70 is similar to regulator 10 of FIG. 1, with the function of control circuit 24 performed by resistor 26, current sense resistor 28, comparator 30, oscillator 32, latch 34, voltage divider resistors 36 and 38, controlled current source 40, error amplifier 42, and reference voltage $V_{REFC}$.

Regulator 70 operates as follows: at the beginning of a cycle, oscillator 32 generates a clock signal that sets latch 34, causing controlled current source 12 to conduct current $I_1$, thereby turning ON transistors 14 and 16. In turn, a voltage $V_L$ of approximately $(V_{IN} - V_{OUT})$ appears across inductor 20, which increases current $I_L$ through the inductor. Diode 18 is OFF, and current sense resistor 28 conducts the collector current of transistor 16, which is approximately equal to inductor current $I_L$.

Voltage $V_i$, which approximately equals $(V_{IN} - I_L * R_1)$, is coupled to the inverting input of comparator 30. Error amplifier 42 amplifies the difference between reference voltage $V_{REFC}$ and feedback voltage $V_{FBC}$ to generate error voltage $V_{ec}$. Error amplifier 42 provides very high gain (typically 40–60 dB). Voltage divider resistors 36 and 38 set $V_{FBC}$ proportional to regulated output voltage $V_{OUT}$. Error voltage $V_{ec}$ is coupled to controlled current source 40, which conducts current $I_2$ proportional to $V_{ec}$. Resistor 26 conducts current $I_2$. Voltage $V_c$, which equals $(V_{IN} - I_2 * R_2)$, is coupled to the non-inverting input of comparator 30.

Comparator 30 generates an output responsive to the sign of the difference $(I_L * R_1 - I_2 * R_2)$. The output of comparator 16 is LOW when $$I_L < \left(\frac{R_2}{R_1}\right) * I_2$$

The output of comparator 30 is HIGH when $$I_L > \left(\frac{R_2}{R_1}\right) * I_2$$

When inductor current $I_L$ exceeds $((R_2/R_1) * I_2)$, the output of comparator 30 goes HIGH and resets latch 34, which causes controlled current source 12 to turn OFF, and thereby turn OFF transistors 14 and 16. This changes $V_L$ to approximately $-V_{OUT}$, forward-biasing diode 18, and causing inductor current $I_L$ to decrease until the next clock pulse of oscillator 32 sets latch 34.

During normal operation, therefore, transistor 16 turns OFF when inductor current $I_L$ exceeds predetermined level $((R_2/R_1) * I_2)$ set by current $I_2$ and resistors $R_1$ and $R_2$. If regulated output voltage $V_{OUT}$ increases above a predetermined steady-state value set by voltage divider resistors 36 and 38 and voltage reference $V_{REFC}$, error voltage $V_{ec}$ decreases, and current $I_2$ decreases. As a result, $I_L$ exceeds $((R_2/R_1) * I_2)$ earlier in the switch cycle than during steady-state operation. The shortened switch ON-duration causes regulated output voltage $V_{OUT}$ to decrease until it reaches its previous steady-state value.

If, however, regulated output voltage $V_{OUT}$ decreases below the predetermined steady-state value, error voltage $V_{ec}$ increases, and current $I_2$ increases. As a result, the ON-duration of transistor 16 is lengthened because $I_L$ exceeds $((R_2/R_1) * I_2)$ later in the switch cycle than during steady-state operation. The lengthened switch ON-duration causes regulated output voltage $V_{OUT}$ to increase until it reaches its previous steady-state value.

Figure 3:
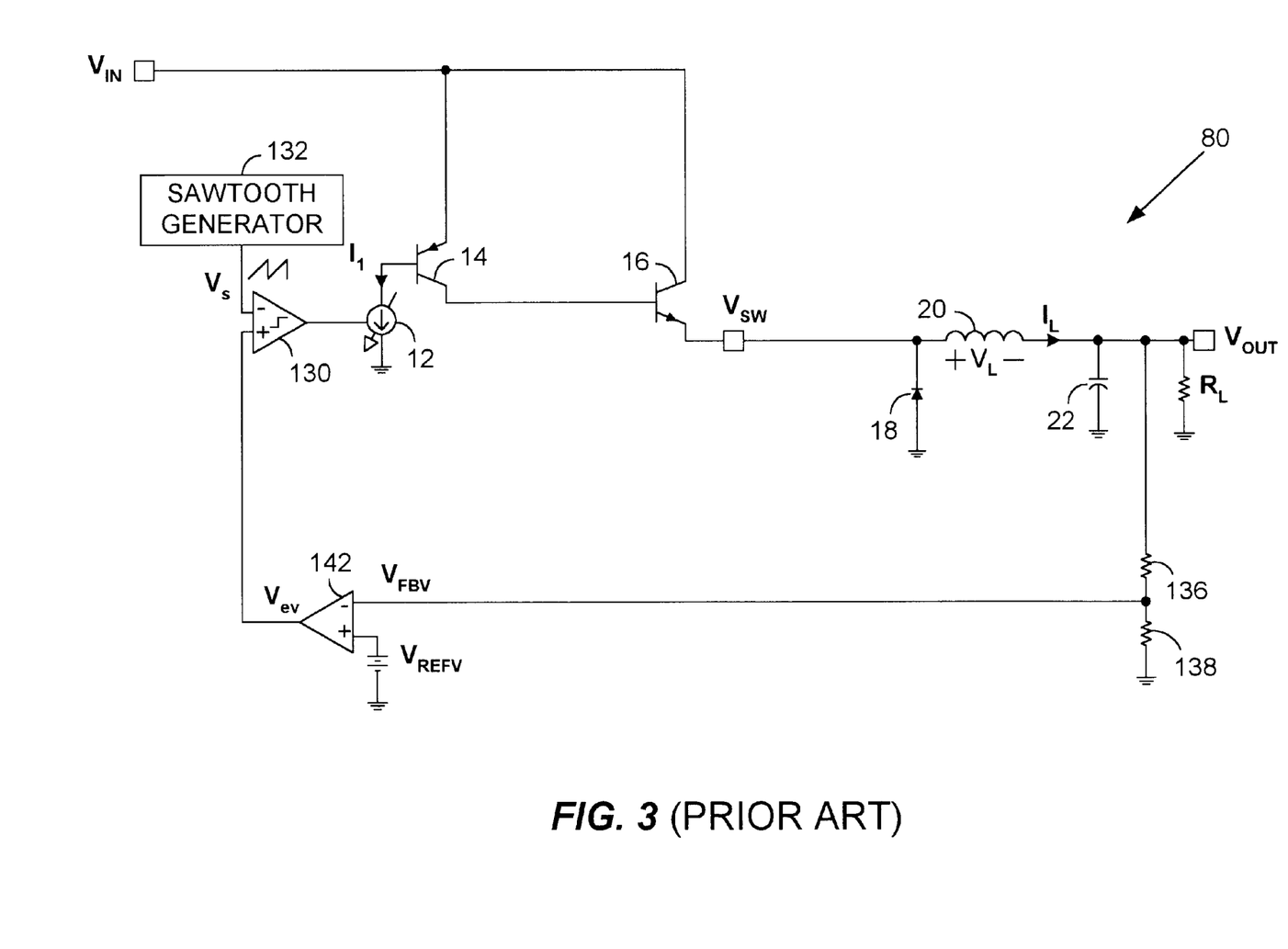
FIG. 3 is a schematic diagram of a previously known buck switching regulator implemented with duty ratio control.

Alternatively, prior art switching regulators may be implemented using duty ratio control, in which the regulator monitors output voltage to directly set duty cycle. FIG. 3 shows such a prior art duty ratio control buck switching regulator 80 that operates as follows: error amplifier 142 amplifies the difference between reference voltage $V_{REFV}$ and feedback voltage $V_{FBV}$ to generate error voltage $V_{EV}$. Error amplifier 142 provides very high gain (typically 40–60 dB). Voltage divider resistors 136 and 138 set $V_{FBV}$ proportional to regulated output voltage $V_{OUT}$. Comparator 130 has a non-inverting input coupled to error voltage $V_{ev}$, and an inverting input coupled to the output voltage $V_s$ of sawtooth generator 132.

At the start of each clock cycle, $V_s$ is below $V_{ev}$, the output of comparator 130 is HIGH, controlled current source 12 conducts current $I_1$, transistors 14 and 16 are ON, and diode 18 is OFF. A voltage $V_L$ of approximately $(V_{IN} - V_{OUT})$ appears across inductor 20, which increases current $I_L$ through the inductor. Comparator 130 turns OFF controlled current source 12 and transistors 14 and 16 (and diode 18 turns ON) when $V_s$ exceeds $V_{ev}$. As in current-mode regulator 70 of FIG. 2, inductor 20 and capacitor 22 form a low-pass filter to remove components at the switching frequency and its harmonics from output voltage $V_{OUT}$.

During normal operation, if $V_{OUT}$ decreases below its desired steady-state value set by voltage divider resistors 136 and 138 and voltage reference $V_{REFV}$ $V_{ev}$ increases and therefore $V_s$ crosses $V_{ev}$ later in the clock cycle, causing comparator 130 to extend the ON-duration of transistor 16. As a result, current $I_L$ flowing through inductor 20 increases, and $V_{OUT}$ increases until it reaches its previous steady-state value. If, however, $V_{OUT}$ increases above its desired steady-state value, $V_{ev}$ decreases and therefore $V_s$ crosses $V_{ev}$ earlier in the clock cycle, causing comparator 130 to shorten the ON-duration of transistor 16. As a result, current $I_L$ flowing through inductor 20 decreases, and $V_{OUT}$ decreases until it reaches its previous steady-state value.

The voltage slew rates of the prior art buck regulators of FIGS. 2 and 3 primarily are a function of the characteristics of transistors 14 and 16. Prior to turn-ON, the voltage at the base of transistor 14 is approximately $V_{IN}$, and its collector voltage is near GROUND. After turn-ON, the voltage at the base of transistor 14 is approximately $(V_{IN} - V_{BE})$ (where $V_{BE}$ is the transistor on-voltage, approximately 0.7 V), and its collector voltage is near $V_{IN}$. During switch turn-ON, a substantial portion of current $I_1$ charges the relatively large base-collector capacitance of transistor 14. This tends to limit the slew rate at the collector of transistor 14, and hence limit positive voltage slew rate at transistor 16 and inductor input node $V_{SW}$.

To effect turn-OFF, current source 12 is turned OFF, removing base current from transistor 14 and turning OFF transistor 14 and cutting off current to the base of transistor 16. With transistor 14 OFF, the collector-base capacitance of transistor 16 is the only source of drive current for transistor 16, and is the only natural limit to negative voltage slew rate. The negative voltage slew rate depends on the output load level, and the active-region current gain (β) of transistor 16, and typically is much faster than the positive voltage slew rate.

Positive current slew rate is limited by the unity-gain frequency ($f_T$) of PNP transistor 14 and the β of transistor 16. In the circuits of FIGS. 2 and 3, negative current slew rate typically is much faster than positive current slew rate. When current source 12 and transistor 14 turn OFF, the product of collector-base capacitance of transistor 16 and negative voltage slew rate equals current, which provides base drive for transistor 16 until node $V_{SW}$ goes slightly below GROUND and diode 18 turns ON. As diode 18 turns ON, the base and emitter of transistor 16 stops voltage slewing. As a result, the base drive to transistor 16 is approximately zero, and the emitter current of transistor 16 rapidly turns OFF. This negative current slew rate is rapid and uncontrolled.

Figure 4:
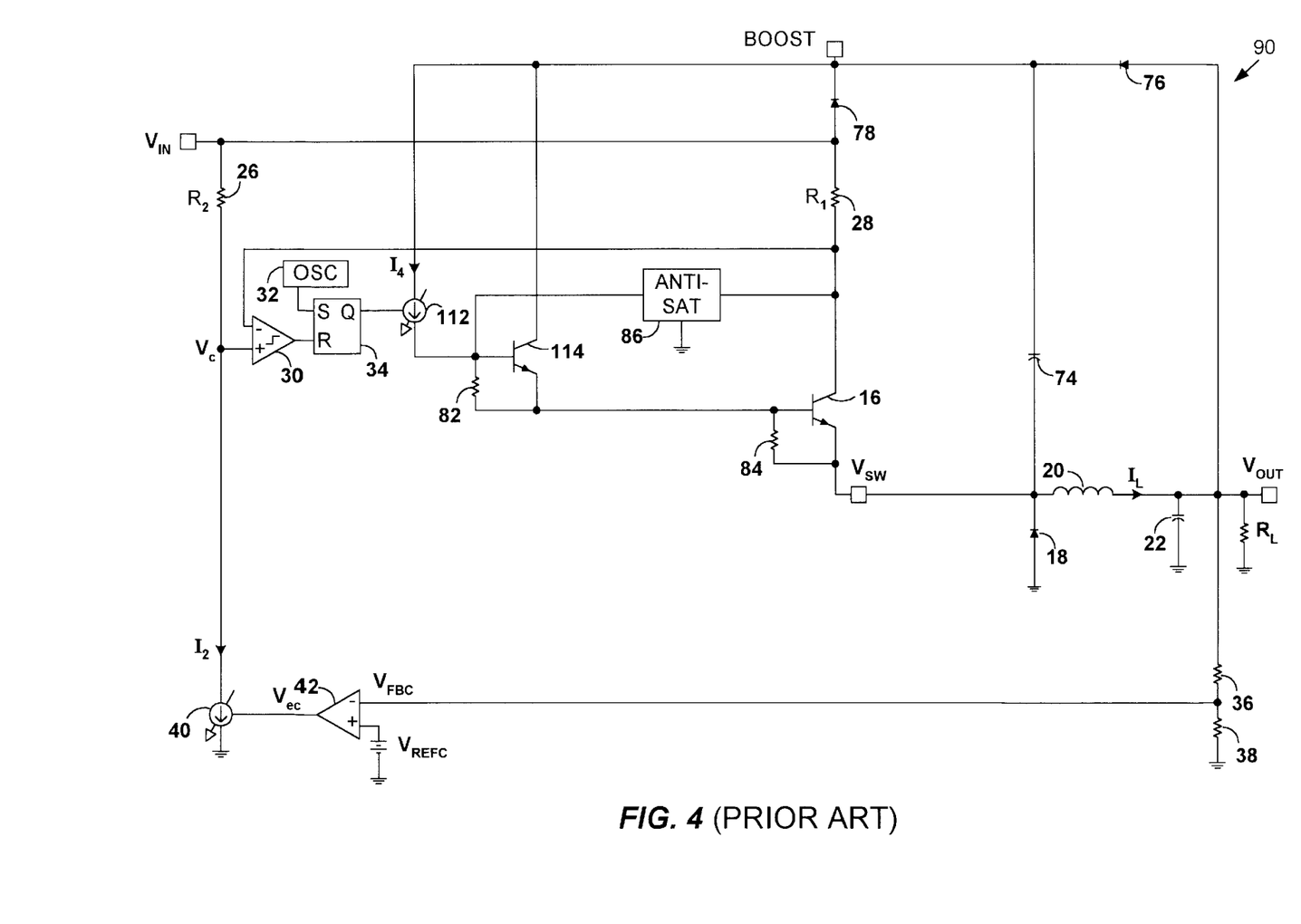
FIG. 4 is a schematic diagram of another previously known buck switching regulator implemented with current programmed control.

FIG. 4 shows a schematic diagram of another previously known buck switching regulator 90 implemented using current programmed control. Regulator 90 is similar to regulator 70 of FIG. 2, but also includes capacitor 74, diodes 76 and 78, resistors 82 and 84 and circuit 86. In addition, controlled current source 112 and NPN transistor 114 replace controlled current source 12 and PNP transistor 14, respectively, of FIG. 2.

Regulator 90 operates similarly to regulator 70, but has additional circuitry for improved efficiency. In particular, the collector of transistor 114 is connected to a pin labeled "BOOST," which is coupled to $V_{OUT}$ by capacitor 74 and diode 76. During normal operation, after transistor 16 turns OFF, $V_{SW}$ goes below ground, diode 76 conducts, and capacitor 74 charges to approximately $V_{OUT}$. On the next switch cycle, when transistor 16 turns ON, $V_{SW}$ switches to approximately $V_{IN}$, diode 76 opens, and the BOOST node increases to approximately ($V_{IN}+V_{OUT}$) As a result, when transistor 114 turns ON, its emitter voltage increases above $V_{IN}$. This permits transistor 114 to drive transistor 16 to near saturation, which minimizes the voltage drop in transistor 16 and improves efficiency.

It is undesirable to drive transistor 16 too strongly into saturation, however, because the resulting turnoff delay would be unacceptably long. To prevent transistor 16 from being driven too deeply into saturation, circuit 86 uses any of several techniques per se known in the art to remove base drive from transistor 114 just at the onset of saturation.

Resistors 82 and 84 are coupled across the base-emitter junctions of transistors 114 and 16, respectively. These resistors help decrease the turnoff time for transistors 114 and 16 and provide paths for any leakage current.

B. Low Noise Buck Regulators

Figure 5:
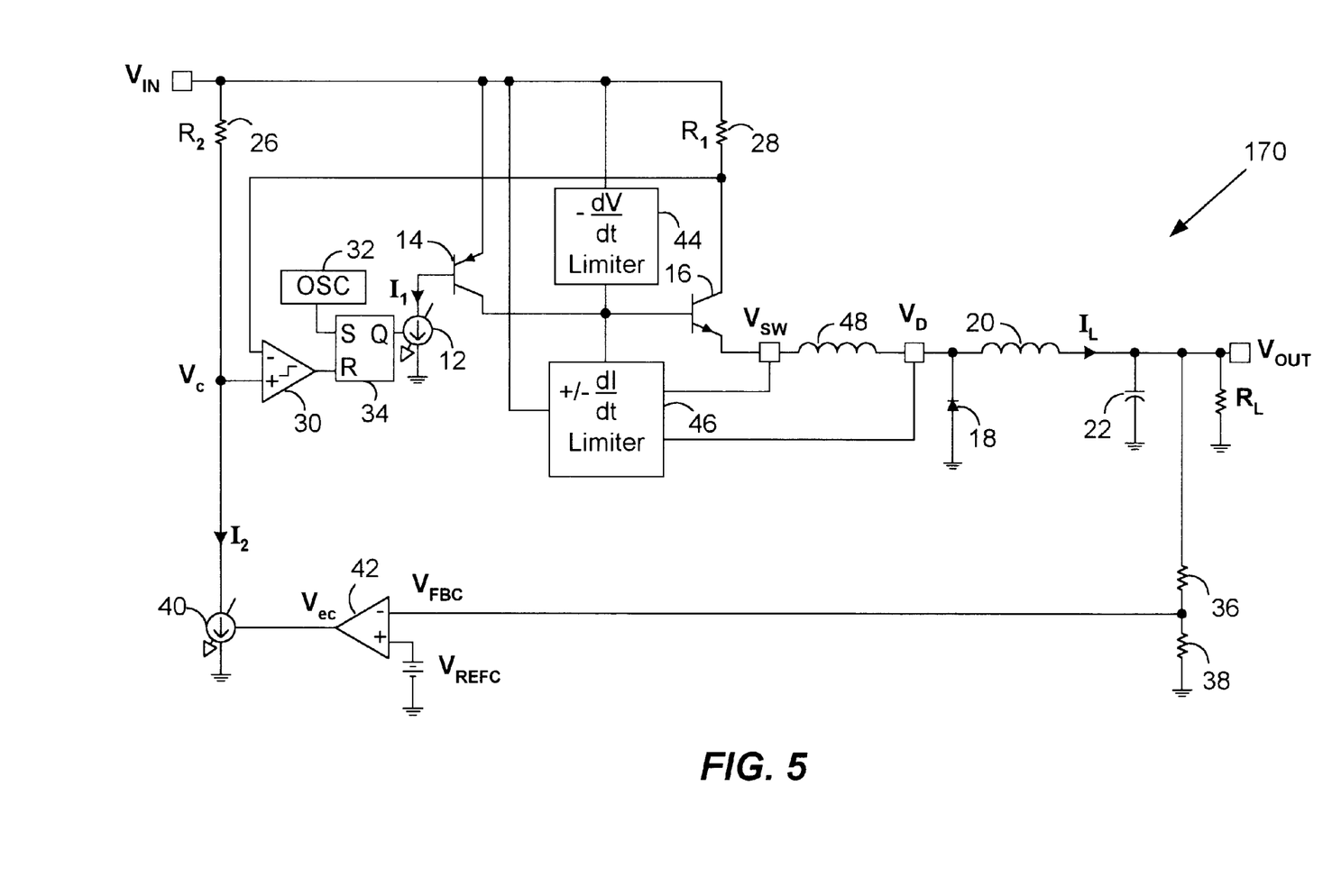
FIG. 5 is an illustrative embodiment of a low noise buck switching regulator constructed in accordance with the principles of the present invention.

FIG. 5 shows a schematic diagram of an illustrative embodiment of a low noise buck switching regulator of the present invention, implemented in a switching regulator similar to circuit 70 of FIG. 2. As described above, the characteristics of transistors 14 and 16 inherently provide positive voltage slew rate limiting in the buck switching regulators of FIGS. 2 and 3. Accordingly, low noise buck switching regulators of this embodiment of the present invention include additional circuitry to limit negative voltage slew rate and positive and negative current slew rate.

In particular, regulator 170 includes negative voltage slew rate limiter circuit 44 coupled between $V_{IN}$ and the base of transistor 16, positive and negative current slew rate limiter circuit 46 coupled to $V_{IN}$ and nodes $V_{SW}$ and $V_D$ across current sense inductor 48. As described in more detail below, during switch turn-OFF, circuit 44 provides base drive to transistor 16 to limit negative voltage slew rate. In addition, during switch turn-ON and turn-OFF, circuit 46 removes base drive from, or provides base drive to, transistor 16 to limit positive and negative current slew rate, respectively.

Figure 6:
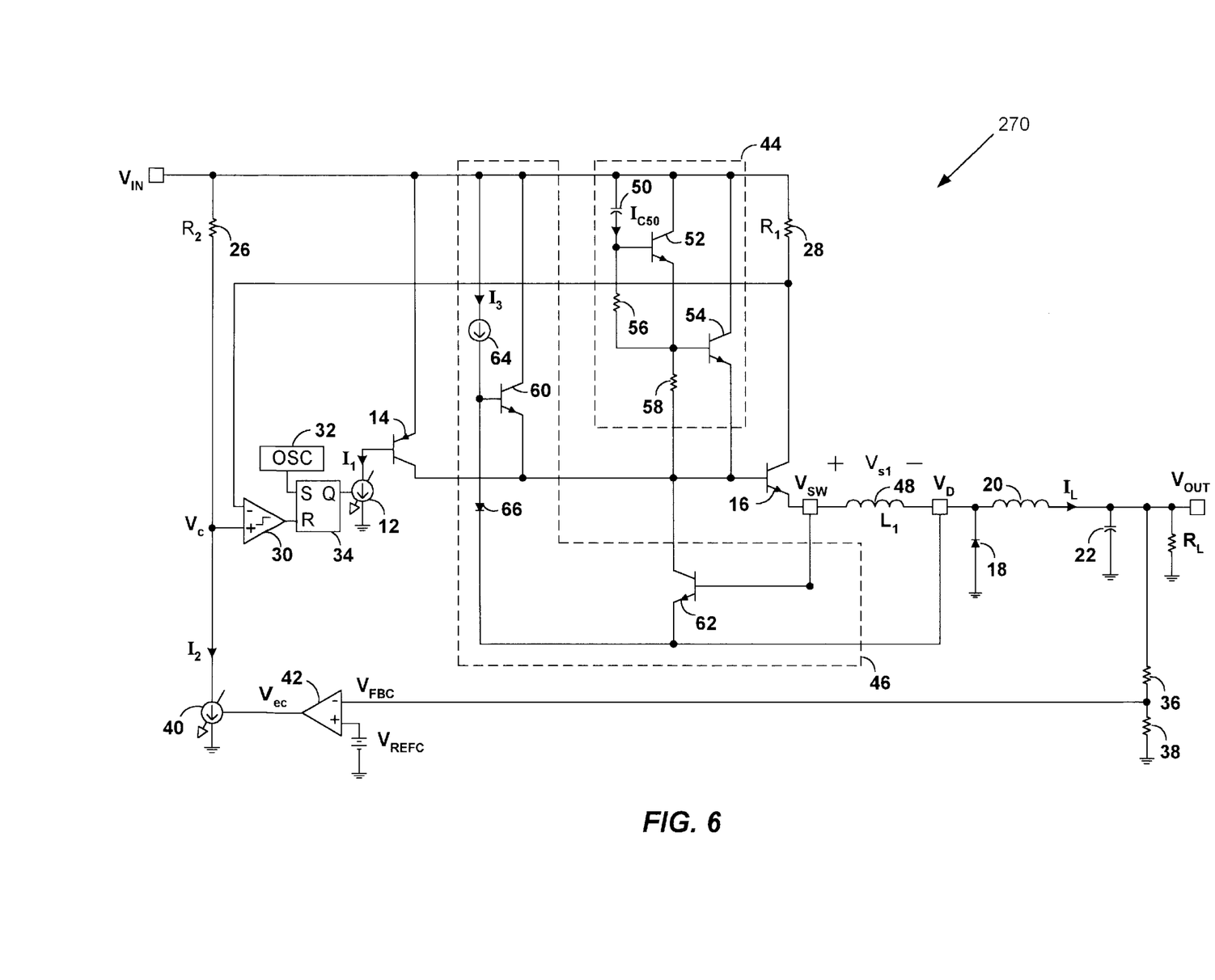
FIG. 6 is an illustrative embodiment of the circuit of FIG. 5.

FIG. 6 shows an illustrative embodiment of the low noise buck switching regulator of FIG. 5. Negative voltage slew rate limiter circuit 44 includes capacitor 50, transistors 52 and 54, and resistors 56 and 58. Transistors 52 and 54 are connected in a Darlington configuration whose input is coupled with capacitor 50 to $V_{IN}$. Current slew rate limiter circuit 46 includes transistors 60 and 62, current source 64 and diode 66.

When transistors 14 and 16 are turned ON, the voltage at the base of transistor 16 is at approximately $V_{IN}$, the current $I_{C50}$ through capacitor 50 is negligible, and resistors 56 and 58, and transistors 52 and 54 are OFF. Current source 64 conducts current $I_3$, which flows through diode 66. The voltages at the base and emitter of transistor 60 are approximately equal, and therefore transistor 60 is OFF. As described below, the voltage difference $V_{s1}$ across sense inductor 48 is approximately zero, and transistor 62 also is OFF.

During switch turn-OFF, transistor 14 turns OFF, the voltage at the base of transistor 16 begins to fall, and capacitor 50 and resistors 56 and 58 begin to conduct current $I_{C50}$. When the voltage drop across resistor 56 is greater than $V_{BE}$, transistor 52 and then transistor 54 turn ON and supply base drive to transistor 16 to limit the negative slew rate. Because transistor 52 only need supply base drive current on the order of hundreds of microamps to transistor 54, transistor 52 can be a minimum geometry (1×) transistor. In contrast, because transistor 54 must supply base drive current on the order of tens of milliamps to transistor 16, transistor 54 must be larger than minimum geometry (e.g., 10×).

The negative voltage slew rate limit equals:

$$\left(\frac{dV}{dt}\right) = -\frac{I_{c50}}{C_{50}} \approx -\frac{V_{BE}/R_{56}}{C_{50}}$$

where $V_{BE}$ is the transistor on-voltage, $C_{50}$ is the capacitance of capacitor 50 and $R_{56}$ is the resistance of resistor 56. Thus, for a desired negative voltage slew rate limit, the circuit values $C_{50}$ and $R_{56}$ may be determined.

Once the voltage at node $V_{SW}$ settles to a value near GROUND, capacitor 50 conducts negligible current, and transistors 52 and 54 therefore turn OFF. Resistor 58 helps turn OFF transistor 54 when no deliberate drive current is present and also prevents breakdown of transistor 54.

Sense inductor 48 has a value $L_1$, and is used to sense current slew rate. During current slewing, the voltage $V_{s1}=(V_{SW}-V_D)$ across sense inductor 48 equals:

$$V_{s1} = L_1 * \left(\frac{dI}{dt}\right)$$

where (dI/dt) is the rate of change of current through inductor 48.

Prior to turn-OFF, the voltages at the base and emitter of transistor 60 are approximately equal, and transistor 60 is OFF. The (dI/dt) through inductor 48 is approximately zero, and therefore $V_{s1}$ is approximately zero and transistor 62 is OFF. During switch turn-OFF, the emitter current of transistor 16 begins to decrease. $V_{s1}$ is proportional to the negative current slew rate in transistor 16. When $V_{s1}$ is more negative than $-V_{BE}$ the base-emitter voltage of transistor 60 exceeds the transistor's on-voltage, turning ON transistor 60 to supply base drive to transistor 16 to limit negative current slew rate to:

$$\left(\frac{dI}{dt}\right) = \frac{V_{s1}}{L_1}$$

Transistor 62 remains OFF during switch turn-OFF. Because transistor 60 must supply base drive current on the order of tens of milliamps to transistor 16, transistor 60 must be larger than minimum geometry (e.g., 10×).

Prior to turn-ON, the base and emitter of transistors 60 and 62 are approximately at GROUND, and therefore transistors 60 and 62 are OFF. During switch turn-ON, the emitter current of transistor 16 increases. $V_{s1}$ is proportional to the positive current slew rate in transistor 16. When $V_{s1}$ is greater than approximately $+V_{BE}$, transistor 62 turns ON and diverts current from the base of transistor 16 and therefore limits the positive current slew rate of regulator 270 to:

$$\left(\frac{dI}{dt}\right) = \frac{V_{s1}}{L_1}$$

Transistor 60 remains OFF during switch turn-ON. Because transistor 62 must sink base drive current on the order of tens of milliamps from transistor 16, transistor 62 must be larger than minimum geometry (e.g., 10×).

The magnitude of the positive and negative current slew rate limits are approximately equal to $(V_{BE}/L_1)$. Based on this magnitude, the value of sense inductor $L_1$ may be chosen.

Figure 7:
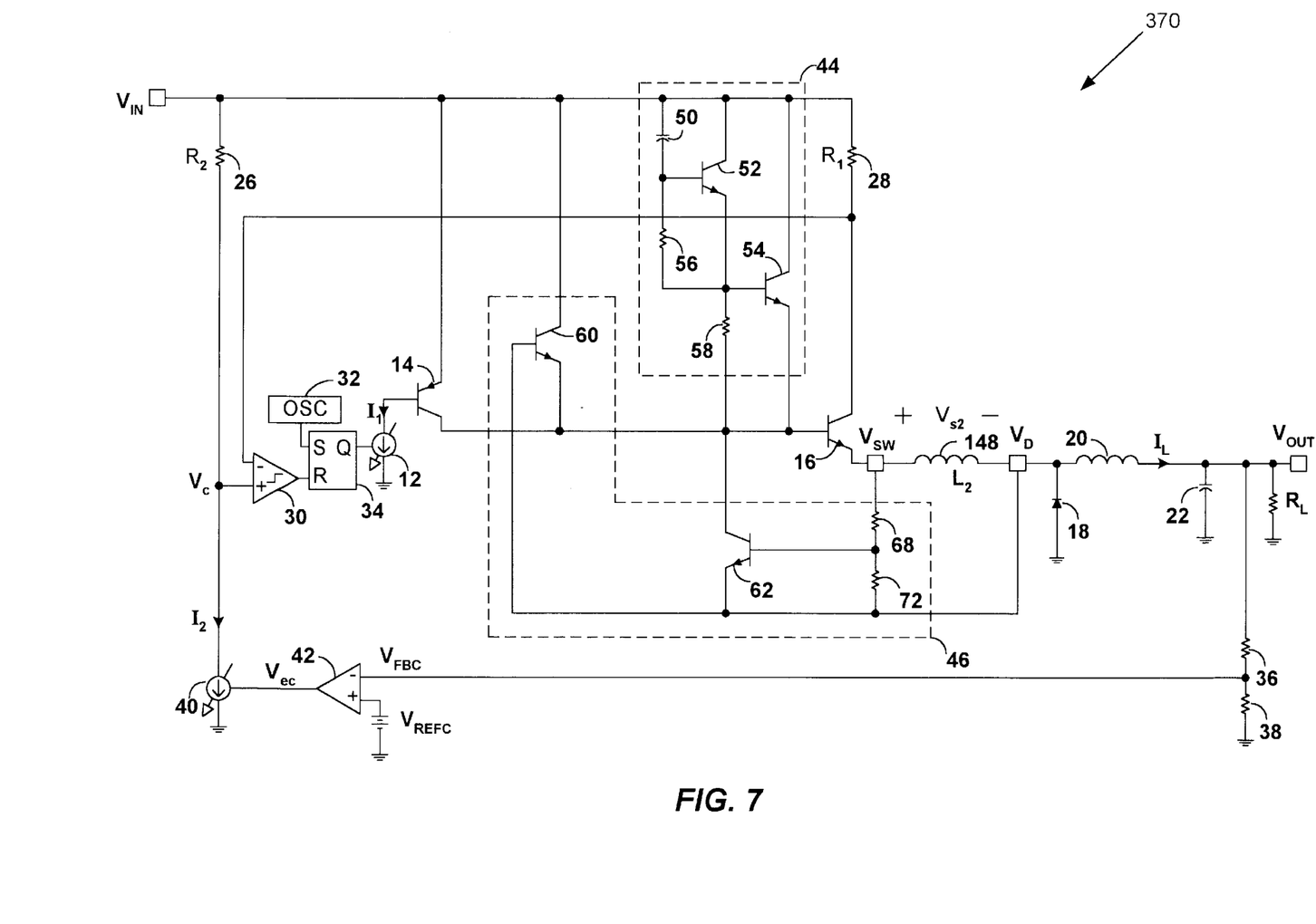
FIG. 7 is an alternative illustrative embodiment of the circuit of FIG. 5.

FIG. 7 shows an alternative illustrative embodiment of the buck switching regulator of FIG. 5. Current slew rate limiter circuit 46 includes transistors 60 and 62, and voltage divider resistors 68 and 72. Voltage divider resistors 68 and 72 have equal values.

Sense inductor 148 has a value $L_2$, and is used to sense current slew rate. During current slewing, the voltage $V_{s2} = (V_{SW}-V_D)$ across sense inductor 148 equals:

$$V_{s2} = L_2 * \left(\frac{dI}{dt}\right)$$

where (dI/dt) is the rate of change of current through inductor 148.

Prior to turn-OFF, the voltage at the base of transistor 60 is approximately equal to $V_{BE}$ below the voltage at the emitter of transistor 60, and transistor 60 is OFF. The (dI/dt) through inductor 148 is approximately zero, and therefore $V_{s2}$ and the voltage across resistors 68 and 72 are approximately zero, and transistor 62 is OFF. During switch turn-OFF, the emitter current of transistor 16 begins to decrease. $V_{s2}$ is proportional to the negative current slew rate in transistor 16. When $V_{s2}$ is more negative than $(-2*V_{BE})$, the base-emitter voltage of transistor 60 exceeds the transistor's on-voltage, turning ON transistor 60 to supply base drive to transistor 16 to limit negative current slew rate to:

$$\left(\frac{dI}{dt}\right) = \frac{V_{s2}}{L_2} \approx -\frac{2*V_{BE}}{L_2}$$

Transistor 62 remains OFF during switch turn-OFF.

Prior to turn-ON, the base-emitter voltage of transistors 60 and 62 are approximately zero, and therefore transistors 60 and 62 are OFF. During switch turn-ON, the emitter current of transistor 16 increases. $V_{s2}$ is proportional to the positive current slew rate in transistor 16. When $V_{s2}$ is greater than approximately $(+2*V_{BE})$, the voltage at the base of transistor 62 is approximately $V_{BE}$ as a result of voltage divider resistors 68 and 72. Transistor 62 turns ON and diverts current from the base of transistor 16 and therefore limits the positive current slew rate of regulator 310 to:

$$\left(\frac{dI}{dt}\right) = \frac{V_{s2}}{L_2} \approx -\frac{2*V_{BE}}{L_2}$$

Transistor 60 remains OFF during switch turn-ON.

The magnitude of the positive and negative current slew rate limits are approximately equal to $(2*V_{BE}/L_2)$. Based on this magnitude, the value of sense inductor $L_2$ may be chosen.

Figure 8:
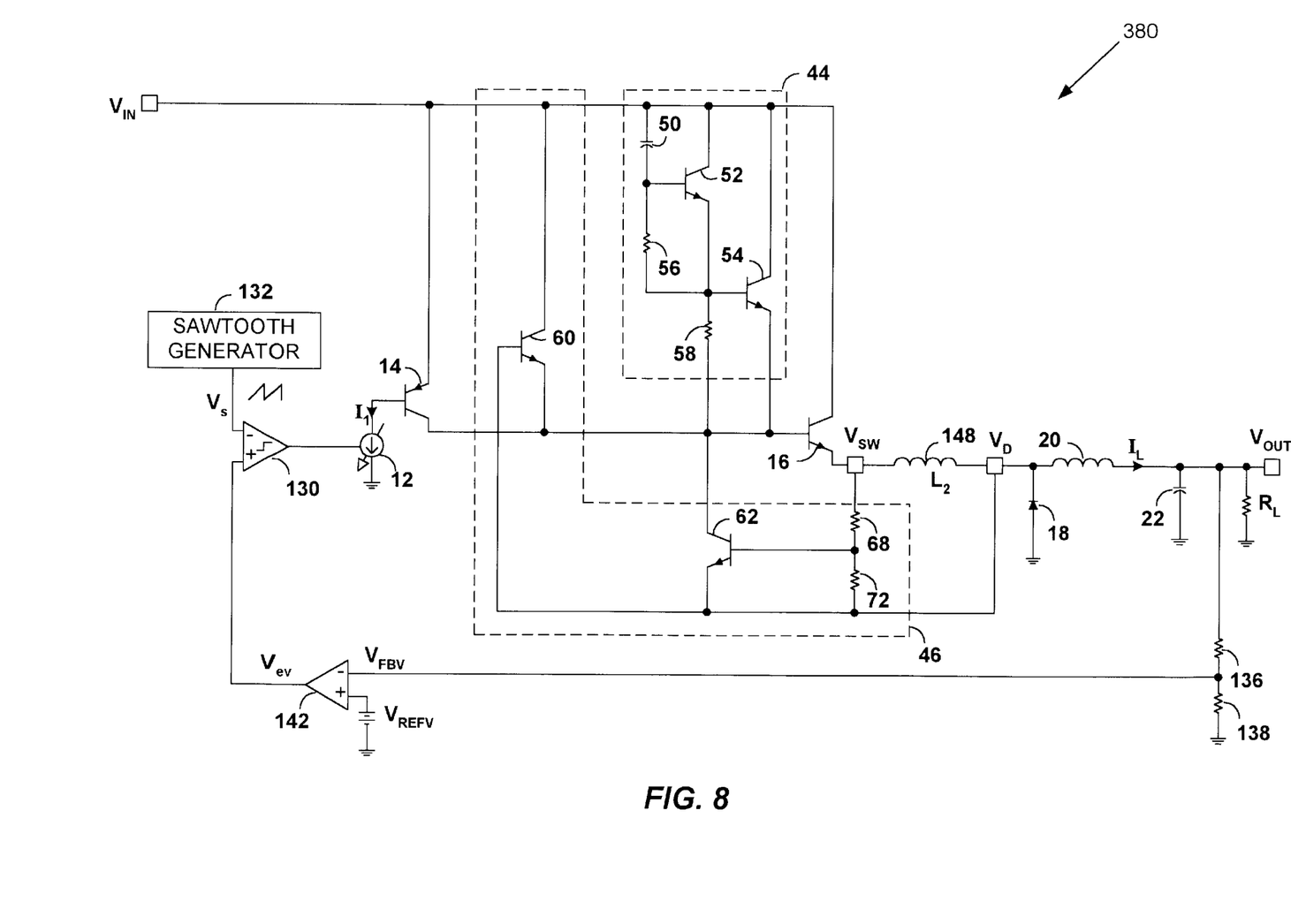
FIG. 8 is an another alternative illustrative embodiment of a low noise buck switching regulator constructed in accordance with the principles of the present invention.

As shown in FIG. 8, the same negative voltage slew rate limit and positive and negative current slew rate limit circuits described above also can be implemented in buck switching regulator 380 that includes duty ratio control.

Figure 9:
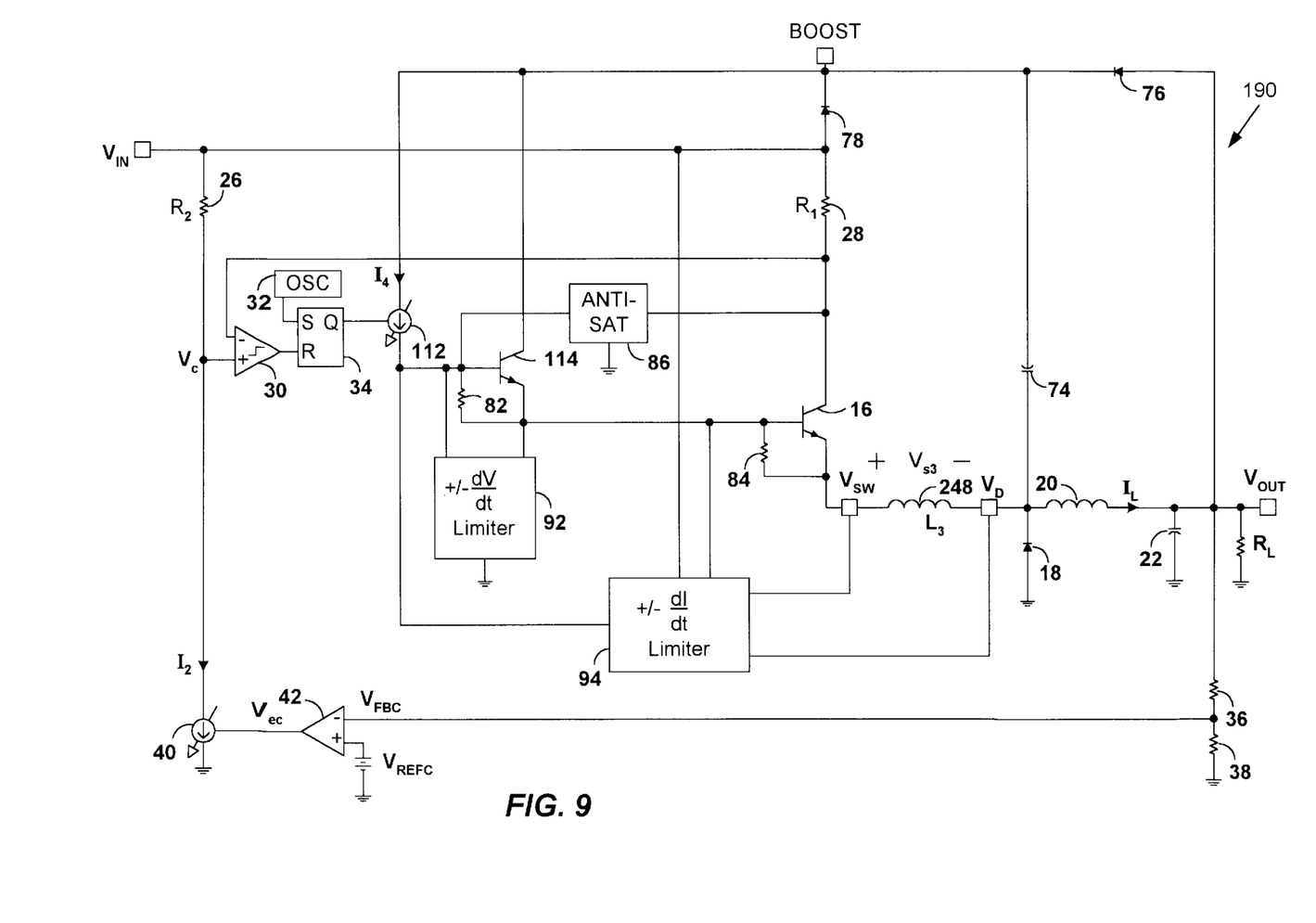
FIG. 9 is still another illustrative embodiment of a low noise buck switching regulator constructed in accordance with the principles of the resent invention.

FIG. 9 shows an alternative embodiment of a low noise buck switching regulator of the present invention, implemented in a switching regulator similar to circuit 90 of FIG. 4. Low noise buck switching regulators of this embodiment includes circuitry to limit positive and negative voltage slew rate and positive and negative current slew rate.

In particular, regulator 190 includes positive and negative voltage slew rate limiter circuit 92 coupled between the base of transistor 114 and GROUND, positive and negative current slew rate limiter circuit 94 coupled to $V_{IN}$, the base of transistor 114, and nodes $V_{SW}$ and $V_D$ across current sense inductor 248. As described in more detail below, during switch turn-ON and turn-OFF, circuit 92 removes base drive from, or provides base drive to, transistor 114 to limit positive and negative voltage slew rate, respectively. In addition, during switch turn-ON and turn-OFF, circuit 94 removes base drive from transistor 114, or provides base drive to transistor 16, to limit positive and negative current slew rate, respectively.

Figure 10:
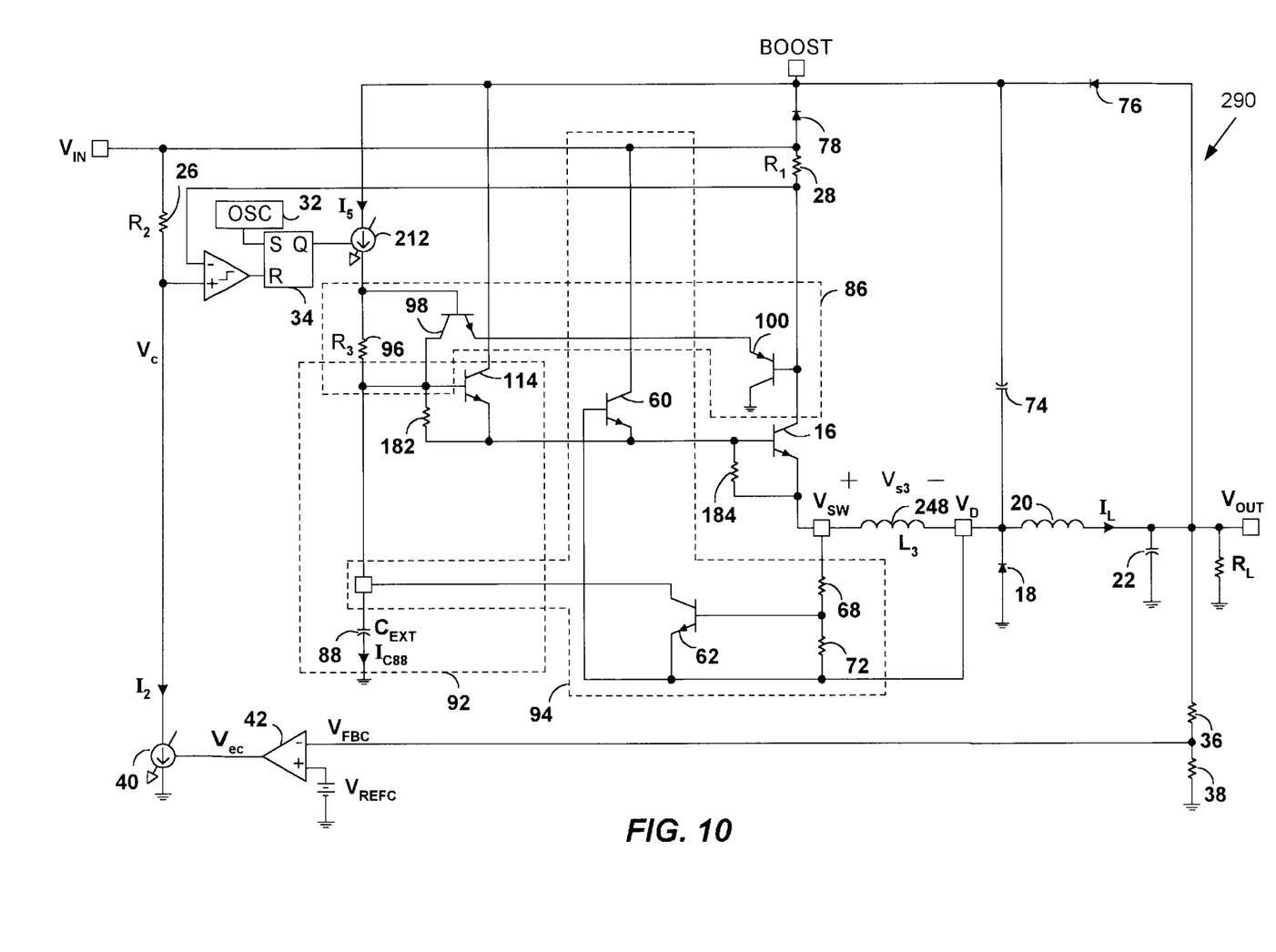
FIG. 10 is an illustrative embodiment of the circuit of FIG. 9.

FIG. 10 shows an illustrative embodiment of the buck switching regulator of FIG. 9. Voltage slew rate limiter circuit 92 includes capacitor 88 and resistor 182. Current slew rate limiter circuit 94 includes transistors 60 and 62, and resistors 68 and 72. Anti-saturation circuit 86 includes resistor 96, NPN transistor 98 and PNP transistor 100.

Controlled current source 212 conducts current $I_5$ when the current source is turned ON. Current $I_5$ is selected so that approximately half the current supplies base current for transistor 114 and the current conducted by resistor 182. The other half of current $I_5$ is available to charge capacitor 88. Resistor 182 conducts a maximum current approximately equal to $(V_{BE}/R_{182})$, where $R_{182}$ is the resistance of resistor 182. $R_{182}$ is chosen so that the current $(V_{BE}/R_{182})$ is several times the base drive current of transistor 114, such that $(I_5/2)$ is approximately equal to $(V_{BE}/R_{182})$ (e.g., several mA).

When transistors 114 and 16 are ON, the voltage at the base of transistor 114 (and the voltage across capacitor 88) is approximately $V_{IN}$, and the current $I_{C88}$ conducted by capacitor 88 is negligible. The base-emitter voltage of transistor 60 is negative, and therefore transistor 60 is OFF. As described below, the voltage $V_{s3}$ across sense inductor $L_3$ is approximately zero, and transistor 62 is OFF.

During switch turn-OFF, current source 212 shuts OFF, the voltage at the base of transistor 114 begins to slew negative. The current $I_{C88}$ of capacitor 88 equals:

$$I_{C88} = C_{EXT}^* \left(\frac{dV}{dt}\right)$$

where $C_{EXT}$ is the capacitance of capacitor 88 and (dV/dt) is the negative voltage slew rate at the base of transistor 114. The maximum current supplied by capacitor 88 during turn-OFF is approximately $(I_5/2)$, and therefore the negative voltage slew rate limit equals:

$$\left(\frac{dV}{dt}\right) = -\left(\frac{I_5/2}{C_{EXT}}\right) \approx -\left(\frac{V_{BE}/R_{182}}{C_{EXT}}\right)$$

Prior to turn-ON, node $V_{SW}$ settles to a value near GROUND, the voltage across capacitor 88 is approximately zero, and $I_{C88}$ is negligible. During switch turn-ON, current source 212 charges capacitor 88, which diverts current from resistor 182 and the base of transistor 116 to limit the positive voltage slew rate. The positive voltage slew rate limit equals:

$$\left(\frac{dV}{dt}\right) = \frac{I_5/2}{C_{EXT}} \approx \frac{V_{BE}/R_{182}}{C_{EXT}}$$

The magnitude of the positive and negative voltage slew rate limits are approximately equal. Based on this magnitude, the circuit value $C_{EXT}$ may be determined.

Sense inductor 248 has a value $L_3$, and is used to sense current slew rate. During current slewing, the voltage $V_{s3} = (V_{SW} - V_D)$ across sense inductor 248 equals:

$$V_{s3} = L_3 * \left(\frac{dI}{dt}\right)$$

where (dI/dt) is the rate of change of current through inductor 248.

Prior to turn-OFF, the base-emitter voltage of transistor 60 is negative, and transistor 60 is OFF. The (dI/dt) through inductor 248 is approximately zero, and therefore $V_{s3}$ is approximately zero and transistor 62 is OFF. During switch turn-OFF, the emitter current of transistor 16 begins to decrease. $V_{s3}$ is proportional to the negative current slew rate in transistor 16. When $V_{s3}$ is more negative than $(-2*V_{BE})$, the base-emitter voltage of transistor 60 exceeds the transistor's on-voltage, turning ON transistor 60 to supply base drive to transistor 16 to limit negative current slew rate to:

$$\left(\frac{dI}{dt}\right) \approx -\left(\frac{2*V_{BE}}{L_3}\right)$$

Transistor 62 remains OFF during switch turn-OFF.

Prior to turn-ON, the base-emitter voltages of transistors 60 and 62 are approximately zero, and therefore transistors 60 and 62 are OFF. During switch turn-ON, the emitter current of transistor 16 begins to increase. $V_{s3}$ is proportional to the positive current slew rate in transistor 16. When $V_{s3}$ is greater than approximately $(+2*V_{BE})$, transistor 62 turns ON and diverts current from the base of transistor 114 and therefore limits the positive current slew rate of regulator 290 to:

$$\left(\frac{dI}{dt}\right) \approx \frac{2*V_{BE}}{L_3}$$

Transistor 60 remains OFF during switch turn-ON.

The magnitude of the negative and positive current slew rate limits are approximately equal. Based on this magnitude, the value of sense inductor $L_3$ may be chosen.

The voltage slew rate limit and current slew rate limit circuit shown in FIG. 10 also can be implemented in buck switching regulator that includes duty ratio control.

Anti-saturation circuit 86 operates as follows. Prior to turn ON, transistors 98 and 100 are OFF. When transistor 114 turns ON, its emitter voltage increases above $V_{IN}$, and transistor 114 begins to drive transistor 16 near saturation. As the voltage at the base of transistor 98 is greater than approximately $(2*V_{BE})$ above the collector of transistor 16, transistors 98 and 100 turn ON, and divert base drive current from transistor 114 into GROUND. Resistor 96 sets the value of the collector-emitter voltage $V_{CE16}$ of transistor 16 to:

$$V_{CE16} \approx V_{R3}$$

where $V_{R3}$ is the voltage drop across resistor 96. $V_{R3}$ is approximately equal to $(I_5*R_3)$, where $I_5$ is the current supplied by controlled current source 212 and $R_3$ is the resistance of resistor 96.

Persons skilled in the art will recognize that the circuitry of the present invention may be implemented using circuit configurations other than those shown and discussed above. All such modifications are within the scope of the present invention, which is limited only by the claims that follow.

I claim:

1. A low noise buck switching regulator that generates an output at an output node from an input at an input node, the regulator comprising:

a switching transistor having a first terminal coupled to the input node, a second terminal, and a third terminal;

an inductor having a first terminal coupled to the third terminal of the switching transistor, and a second terminal coupled to the output node;

a first circuit having a first terminal coupled to the second terminal of the switching transistor, and a second terminal coupled to the input node, the first circuit limiting a voltage slew rate at the third terminal of the switching transistor to a first predetermined value; and a second circuit having a first terminal coupled to the first terminal of the inductor, a second terminal coupled to the second terminal of the inductor, and an third terminal coupled to the second terminal of the switching transistor, the second circuit limiting a current slew rate at the third terminal of the switching transistor to a second predetermined value.

2. The regulator of claim 1, wherein the first circuit limits a negative voltage slew rate at the third terminal of the switching transistor to the first predetermined value.

3. The regulator of claim 1, wherein the first circuit limits a positive voltage slew rate at the third terminal of the switching transistor to the first predetermined value.

4. The regulator of claim 1, wherein the first circuit limits a magnitude of a negative and a magnitude of a positive voltage slew rate at the third terminal of the switching transistor to the first predetermined value.

5. The regulator of claim 1, wherein the second circuit limits a negative current slew rate at the third terminal of the switching transistor to the second predetermined value.

6. The regulator of claim 1, wherein the second circuit limits a positive current slew rate at the third terminal of the switching transistor to the second predetermined value.

7. The regulator of claim 1, wherein the second circuit limits a magnitude of a negative and a magnitude of a positive current slew rate at the third terminal of the switching transistor to the second predetermined value.

8. The regulator of claim 1, wherein the switching transistor comprises a bipolar junction transistor.

9. The regulator of claim 8, wherein the bipolar junction transistor comprises a collector coupled to the input terminal, a base coupled to the first terminal of the first circuit and the third terminal of the second circuit, and an emitter coupled to the first terminal of the inductor.

10. The regulator of claim 1, wherein the regulator comprises current programmed control circuitry coupled to the second terminal of the switching transistor.

11. The regulator of claim 1, wherein the regulator comprises duty ratio control circuitry coupled to the second terminal of the switching transistor.

12. The regulator of claim 1, wherein the first circuit comprises:
a capacitor comprising a first terminal coupled to the second terminal of the switching transistor, and a second terminal coupled to the input node, and wherein the first predetermined value is inversely proportional to the capacitance of the capacitor.

13. The regulator of claim 12, wherein the first circuit further comprises:
a resistor comprising a first terminal coupled to the first terminal of the capacitor, and a second terminal coupled to the second terminal of the switching transistor, and wherein the first predetermined value is inversely proportional to the product of the resistance of the resistor and the capacitance of the capacitor.

14. The regulator of claim 13, wherein the first circuit further comprises:
a transistor comprising a first terminal coupled to the input node, a second terminal coupled to the first terminal of the resistor, and a third terminal coupled to the second terminal of the resistor, and wherein the first predetermined value is proportional to an on-voltage of the transistor, divided by the product of the resistance of the resistor and the capacitance of the capacitor.

15. The regulator of claim 1, wherein the second circuit comprises:
a first transistor comprising a first terminal coupled to the input node, a second terminal coupled to the second terminal of the inductor, and a third terminal coupled to the second terminal of the switching transistor; and
a second transistor comprising a first terminal coupled to the second terminal of the switching transistor, a second terminal coupled to the first terminal of the inductor, and a third terminal coupled to the second terminal of the inductor, and wherein the second predetermined level is proportional to an on-voltage of the second transistor divided by the inductance of the inductor.

16. The regulator of claim 15, wherein the second predetermined level is approximately equal to the on-voltage of the second transistor divided by the inductance of the inductor.

17. The regulator of claim 15, wherein the second predetermined level is approximately equal to twice the on-voltage of the second transistor divided by the inductance of the inductor.

18. A method for limiting voltage and current slew rates of a buck switching regulator, the method comprising:
providing an input at an input node;
providing a switching transistor having a first terminal coupled to the input node, a second terminal, and a third terminal;
providing an inductor having a first terminal coupled to the third terminal of the switching transistor, and a second terminal coupled to the output node;
providing a first circuit having a first terminal coupled to the second terminal of the switching transistor, and a second terminal coupled to the input node, the first circuit limiting a voltage slew rate at the third terminal of the switching transistor to a first predetermined value; and
providing a second circuit having a first terminal coupled to the first terminal of the inductor, a second terminal coupled to the second terminal of the inductor, and an third terminal coupled to the second terminal of the switching transistor, the second circuit limiting a current slew rate at the third terminal of the switching transistor to a second predetermined value.

19. A method for limiting a voltage slew rate at a first node of a buck switching regulator, and limiting a current slew rate at a second node of the buck switching regulator, the buck switching regulator having a third node that controls the voltage at the first node, and a fourth node that controls the current at the second node, the method comprising:
sensing a rate of change of voltage at the third node;
providing a first current at the third node proportional to the rate of change of voltage at the third node, the first current limiting the voltage slew rate at the first node to a first predetermined value;
sensing a rate of change of current at the second node; and
providing a second current at the fourth node proportional to the rate of change of current at the second node, the second current limiting the current slew rate at the second node to a second predetermined value.

20. The method of claim 19, wherein the first and second nodes are the same node, and the third and fourth nodes are the same node.

21. A low noise buck switching regulator that generates an output at an output node from an input at an input node, the regulator comprising:
a switching transistor having a first terminal coupled to the input node, a second terminal, and a third terminal;
an inductor having a first terminal coupled to the third terminal of the switching transistor, and a second terminal coupled to the output node; and
a first circuit having a resistor, capacitor and a first transistor, the resistor having first and second terminals, the capacitor having first and second terminals, and the first transistor having first, second and third terminals, the first terminal of the capacitor coupled to the first terminal of the first transistor and to the input node, the second terminal of the capacitor coupled to the first terminal of the resistor and the second terminal of the first transistor, the second terminal of the resistor coupled to the third terminal of the first transistor and to the second terminal of the switching transistor.

22. The switching regulator of claim 21, wherein:
the first transistor is a bipolar junction transistor having a collector, a base and an emitter; and
the first terminal of the capacitor is coupled to the collector of the first transistor and to the input node, the second terminal of the capacitor is coupled to the first terminal of the resistor and the base of the first transistor, and the second terminal of the resistor is coupled to the emitter of the first transistor and to the second terminal of the switching transistor.

23. A low noise buck switching regulator that generates an output at an output node from an input at an input node, the regulator comprising:
a switching transistor having a first terminal coupled to the input node, a second terminal, and a third terminal;
an inductor having a first terminal coupled to the third terminal of the switching transistor, and a second terminal coupled to the output node; and a first circuit having a resistor, capacitor and a first transistor, the resistor having first and second terminals, the capacitor having first and second terminals, and the first transistor having first, second and third terminals, the first terminal of the first transistor coupled to the input node, the second terminal of the first transistor coupled to the first terminal of the capacitor and to the first terminal of the resistor, the third terminal of the first transistor coupled to the second terminal of the switching transistor and the second terminal of the resistor, the second terminal of the capacitor coupled to GROUND.

24. The switching regulator of claim 23, wherein:

the first transistor is a bipolar junction transistor having a collector, a base and an emitter; and the collector of the first transistor is coupled to the input node, the base of the first transistor is coupled to the first terminal of the capacitor and to the first terminal of the resistor, and the emitter of the first transistor is coupled to the second terminal of the switching transistor and the second terminal of the resistor.

25. A low noise buck switching regulator that generates an output at an output node from an input at an input node, the regulator comprising:

a switching transistor having a first terminal coupled to the input node, a second terminal, and a third terminal;

an inductor having a first terminal coupled to the third terminal of the switching transistor, and a second terminal coupled to the output node; and a second circuit having a second and third transistor, the second transistor having first, second and third terminals, the third transistor having first, second and third terminals, the first terminal of the second transistor coupled to the input node, the second terminal of the second transistor coupled to the second terminal of the inductor, the third terminal of the second transistor coupled to the second terminal of the switching transistor, the first terminal of the third transistor coupled to the second terminal of the switching transistor, the second terminal of the third transistor coupled to the first terminal of the inductor, the third terminal of the third transistor coupled to the second terminal of the inductor.

26. The switching regulator of claim 25, wherein:

the second transistor is a bipolar junction transistor having a collector, base and emitter;

the third transistor is a bipolar junction transistor having a collector, base and emitter;

the collector of the second transistor is coupled to the input node, the base of the second transistor is coupled to the second terminal of the inductor, the emitter of the second transistor is coupled to the second terminal of the switching transistor; and the collector of the third transistor is coupled to the second terminal of the switching transistor, the base of the third transistor is coupled to the first terminal of the inductor, and the emitter of the third transistor is coupled to the second terminal of the inductor.

27. A low noise buck switching regulator that generates an output signal at an output node from an input signal at an input node, the regulator comprising:

a means for switching the input signal coupled between the input node and the output node;

a current slew-rate sensing means coupled between the switching means and the output node;

a means for limiting a voltage slew rate of the switching regulator to a first predetermined value, the voltage limiting means coupled between the input node and the switching means; and a means for limiting a current slew rate of the switching regulator to a second predetermined value, the current limiting means coupled across the current slew-rate sensing means and to the switching means.

28. The switching regulator of claim 27, wherein the voltage slew-rate limiting means limits a magnitude of a negative voltage slew-rate of the switching regulator to the first predetermined value.

29. The switching regulator of claim 27, wherein the voltage slew-rate limiting means limits a magnitude of a positive voltage slew-rate of the switching regulator to the first predetermined value.

30. The switching regulator of claim 27, wherein the voltage slew-rate limiting means limits a magnitude of a negative voltage slew-rate and a magnitude of a positive voltage slew-rate to the first predetermined value.

31. The switching regulator of claim 27, wherein the current slew-rate limiting means limits a magnitude of a negative current slew-rate of the switching regulator to the second predetermined value.

32. The switching regulator of claim 27, wherein the current slew-rate limiting means limits a magnitude of a positive current slew-rate of the switching regulator to the second predetermined value.

33. The switching regulator of claim 27, wherein the current slew-rate limiting means limits a magnitude of a negative current slew-rate and a magnitude of a positive current slew-rate to the second predetermined value.

* * * * *